United States Patent [19]

Mailloux

[11] 3,830,962

[45] Aug. 20, 1974

[54] GRAPHICAL DATA PROCESSOR INTERFACE

[75] Inventor: Louis D. Mailloux, Fairport, N.Y.

[73] Assignee: Xerox Corporation, Rochester, N.Y.

[22] Filed: Oct. 19, 1972

[21] Appl. No.: 298,993

[52] U.S. Cl. .................. 178/6, 178/69.5, 340/146.3, 340/172.5

[51] Int. Cl. ......... H04n 1/32, H04n 1/36, H04n 1/42

[58] Field of Search ............................ 178/6, 6.8, 178/6.6 A; 179/15.5 SR; 325/38 A; 340/146.3, 172.5

[56] References Cited

UNITED STATES PATENTS

| | | | |
|---|---|---|---|
| 3,459,886 | 8/1969 | Doundoulakis | 178/6.8 |
| 3,499,975 | 3/1970 | Arps | 178/6 |
| 3,558,811 | 1/1971 | Montevecchio | 178/6 |
| 3,622,695 | 11/1971 | Rugaber | 178/6 |
| 3,729,678 | 4/1973 | Giasbergen | 325/38 A |

*Primary Examiner*—Howard W. Britton
*Assistant Examiner*—Edward L. Coles
*Attorney, Agent, or Firm*—Kaufman & Kramer

[57] ABSTRACT

An improved interface adaptor unit for interconnecting a facsimile graphic communication system with a central processing unit. The interface adaptor unit includes a central controller with a control counter controlling isolated synchronization and video data transfer operations. The unit also includes control logic, a buffer operating through a shift register and control logic for monitoring the flow of data in accordance with counter control. Provision is made within the control logic for deriving specific status signals from the facsimile unit for indicating the various conditions of the facsimile unit prior to and during transmission of information between the computer and the facsimile transmission system.

32 Claims, 9 Drawing Figures

PATENTED AUG 20 1974

3,830,962

SHEET 3 OF 7

GRAPHICAL DATA PROCESSOR INTERFACE

This invention relates to facsimile transmission schemes and, more particularly, to computer controlled facsimile systems employing an improved interface adaptor unit interconnecting the computer and facsimile system.

In conventional facsimile systems, documents to be transmitted are scanned at a transmitting station to convert information on the document into a series of electrical signals. The electrical signals, corresponding to a video information signal, or the carrier modulated signal corresponding thereto, is coupled to the input of a communication link interconnecting the transmitter with a receiver. Typical modes for accomplishing this effect are by use of acoustic couplers through conventional telephone lines, long distance communication lines, and other forms of interconnecting techniques. At receiving locations, the video signal in conjunction with suitable synchronizing signals, selectively controls the actuation of an appropriate marking or other reproduction device to generate a facsimile of the document transmitted.

The use of data terminal devices for the transmission and reproduction of information by facsimile techniques has seen a rapid expansion in employment. In addition, the use of data processing equipment in conjunction with the transmission and reception of information has become increasingly widespread. As data processing equipment has grown in complexity and speed, it is ever more required that input and output equipment interfacing to the computer be capable of adapting to the high speed of the computer for efficient and accurate information handling. Many types and devices interfacing with computers have attempted to maintain high speed compatability. Such devices as card punch machines, high speed typewriters, magnetic disc arrays, high speed magnetic tape units, as well as various types of memory systems and other such devices have been employed. Obviously, since it is often desirable to convert information on graphs, charts, maps, drawings and other documentary form of display into formats that may be utilized and understood by a computer for operation thereon, it is evident that conversion of such graphic information to computer usable form is a desirable feature. In addition, it is just as desirable to be able to convert information stored in a computer in the form of a computer language into a graphic representation.

One suggested method of interfacing a computer with a facsimile system for accomplishing the foreging effect is disclosed in U.S. Pat. No. 3,558,811 issued Jan. 26, 1971 and assigned to the assignee of the present invention. In that patent, an interface adaptor unit is disclosed for interfacing a computer such as an IBM 360 type model available from the International Business Machines Corporation, Armonk, New York with a facsimile system such as the LDX facsimile system manufactured by the Xerox Corporation of Rochester, New York.

The interface adaptor described in the aforementioned patent, while effectively performing its function, maintains a certain degree of complexity due to the nature of the interface required by the computer type exemplified in the IBM 360 models. For example, the interface unit described therein operates to provide synchronization and video data on a common line by means of multiplexing techniques. While effective, the use of multiplexing requires a more complex control arrangement as well as increasing the stringency requirements for timing the switching.

It is thus evident that the need exists for simplifying the interface between the computer and the facsimile system while at the same time providing a control system which will permit not only an improved but simplfied operation, but will allow certain additional desirable features to be employed with the facsimile system. For example, monitoring of machine conditions, the use of additional mechanical controls within the facsimile machine, the use of remote control operations for overriding the computer control, and other such features would be desirable. At the same time, however, modifications of either the computer or the facsimile system should be minimized or at least performed in a manner which does not interfere with the standard manufacturing operations of either computer or facsimile system.

It is, therefore, a prime object of the present invention to provide a novel interface unit between a facsimile communication system and a computer for controlling the flow of information therebetween.

It is a further object of the present invention to provide an optimized information flow between the computer and the facsimile communcation system by means of an interface adaptor of relatively efficient construction and logic operation.

It is a further object of the present invention to provide an interface adaptor operable between a computer and a facsimile communication system which will take into account specific facsimile machine conditions as an input condition directing the flow of information.

It is another object of the present invention to provide an interface adaptor which will enhance the mechanical control available between computer and facsimile system.

It is still a further object of the present invention to provide a novel and unique interface adaptor between a computer and a facsimile communication system which may be externally controlled by remote devices.

The foregoing objects are accomplished by means of a graphic communication system including a facsimile system and a computer interconnected by an electrical interface which includes a control counter synchronizing the flow of information between the computer and the facsimile system in accordance with a condition responsive logic circuit. The logic circuit responds to specific conditions provided by the facsimile system in order to set up the flow of information in both the direction and at the times desired between the computer and the facsimile system. In addition, the interface adaptor includes a buffer unit and a shifting unit, each under the control of the counter in accordance with the conditions provided by the control logic for governing the transfer of information in a synchronized manner. Provision is made within the control logic for responding to specific conditions within the facsimile system for providing an indication of a specific problem inhibiting the operation of the system.

The logic circuit interacts with the facsimile system in a manner enabling either computer generated orders or manually generated orders to effect machine operations with the facsimile unit.

By use of the separate control counter, by which the operation of the system is controlled, provision may be made for separating the synchronizing signal from the video data signal, thereby eliminating the necessity for complex multiplexing equipment and timing circuits incident thereto.

The control logic contains further provision for remote control activation of the facsimile unit overriding the control of the central processor unit, and for computer activated and remote activated mechanical controls over the facsimile unit.

The foregoing objects and brief description of the present invention as well as further objects and additional features thereof will become more apparent from the following more detailed description and appended drawings wherein.

Figure 1:
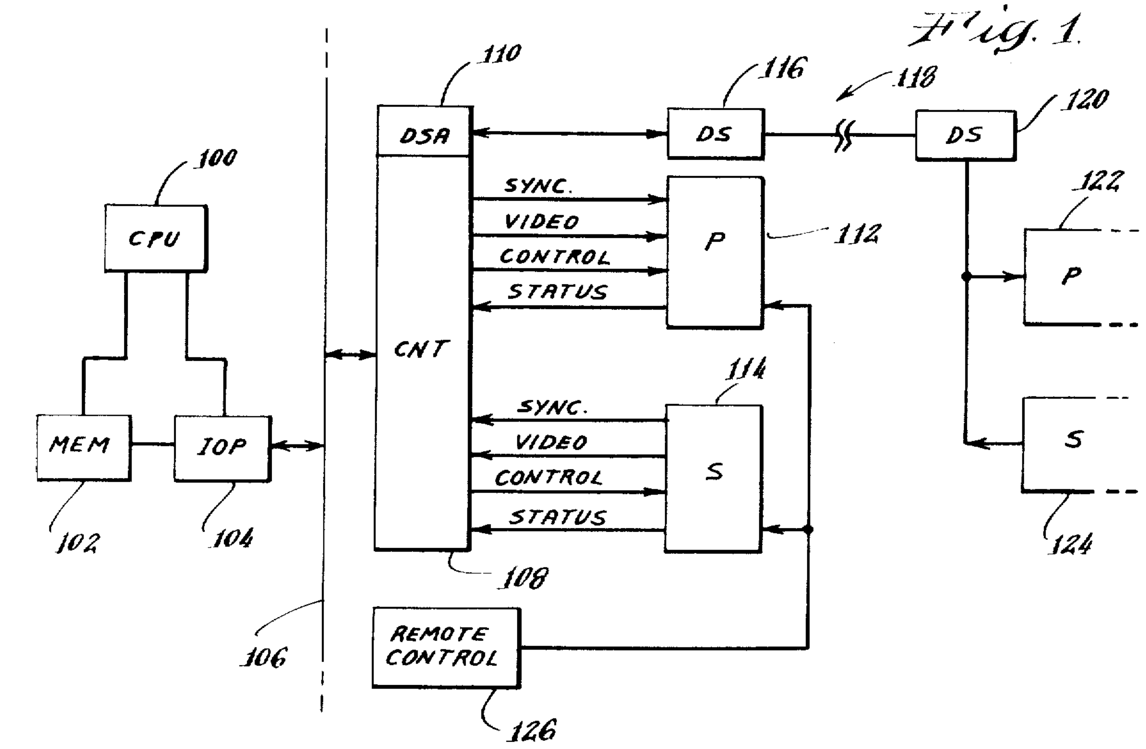
FIG. 1 is a general block diagram of a central processor interfacing with a facsimile system.

Facsimile communications systems are currently available from a variety of manufacturers. The purpose of the facsimile communications system is to recreate or to transmit information appearing on a document. In either case, the information is provided in the form of video signals and synchronizing signals which are provided to or from the facsimile system in accordance with the information being transmitted or received. A typical facsimile system currently available commercially is manufactured by the Xerox Corporation and is known as the LDX facsimile system. The LDX system is a high speed system capable of operation over a microwave radio or large band width telephone links. Due to the high speed in transmission and attendant sophistication of scanning and printing circuits, the use of separate scanners and printers is conventional in completing an LDX system. The scanner of an LDX system is conventionally designed with cathode ray tube scanning for deriving information to be transmitted, whereas the printer is also designed with a cathode ray derived beam for effecting a visual printout. A more complete description of the LDX system may be had by reference to U.S. Pat. Nos. 3,149,201 and 3,303,280, both of which are assigned to the same assignee as the present invention, and the disclosures of which are both specifically incorporated herein by reference.

As was stated hereinabove, the massive increase of data communications facilities has necessitated the use of high speed data processing units. The advantages of utilizing facsimile communications systems with high speed data processing units therefore become particularly apparent in the solution of such communication problems. The computer interface adaptor, which is the subject of the present invention, may be employed with any type of facsimile communication system for interfacing with any of the known high speed digital computers such as are presently available. One such computer employable in conjunction with the preferred embodiment of the present invention to be described hereinafter is the Sigma computer series, a data processing unit manufactured by the Xerox Data Systems Division of the Xerox Corporation, El Segundo, California. This computer is a high speed digital computer utilizing integrated circuits, digital logic modules, an addressable storage memory, and an input-output processor. Several models of the Sigma series are presently being manufactured in accordance with customer requirements, including such models as the Sigma 2, 3, 5 and 7. It will, of course, be understood that while the Xerox LDX facsimile system is but one example of a system, known in the facsimile art, and that the Sigma series computer is but one example of a digital computer, well known in the computer art, the following discussion for convenience will relate to the interfacing of these two systems. It will be understood, however, that any of the known facsimile systems and digital computer systems may be utilized with a computer adaptor such as is set forth herein without deviating from the principles of the present invention.

I. GENERAL SYSTEM

In order to understand the improved interface adaptor described herein, the following description will illustrate the use of an LDX graphic communications system in conjunction with the Sigma computer, although it will be understood that this following description is exemplary of a preferred usage of the novel adapter described herein and that other combinations of central processing units in graphic communications systems may be employed with the interfacing adaptor of the present invention. As is shown in FIG. 1, the typical computer configuration employed in a Sigma type of computer includes a central processor unit (CPU) 100, a memory 102, and an input-output processing device 104. The central processing unit interacts with the memory 102 in conjunction with the input-output processor 104 for the purpose of transmitting and receiving data in accordance with a pre-programmed set of instructions stored in the memory 102 in a known manner. The memory 102 which may be a magnetic core or semiconductor or other known type of storage device is utilized in known manner to interact between the central processing unit 100 and the input-output processor 104 to effect the transfer and receipt of information in accordance with such programming. The input-output processor 104 provides lines through which peripherals are controlled by the CPU and provides lines for the data exchange between peripherals and the memory. Description of the operation of an input-output processor employed with the Sigma computer may be found in publication entitled *XDS Sigma Computer Systems/Interface Design Manual* published by the Xerox Data systems, El Segundo, California, December 1969.

The data lines emerging from the input-output processor and coupled to a common data bus line or data path indicated generally as 106. In this particular configuration, the data path 106 is illustrated as coupled to one of what is presumed to be a plurality of peripheral devices performing various functional operations. In this case, the peripheral device is a facsimile communication system such as the LDX graphic communication system described more fully in the aforementioned U.S. Pat. Nos. 3,149,201 and 3,303,280. Data provided along the data path 106 is coupled by means of an appropriate information channel to the interface adaptor or controller 108. As indicated, the controller 108 includes a data set adaptor 110. Cooperating with the controller 108 is a facsimile communications system which will include typically a printer 112 and a scanner 114. As is evident from the foregoing discussion, the printer is utilized to reproduce information transmitted thereto in the form of data derived from the CPU 100, whereas the scanner 114 is utilized to place information derived from a document into the CPU 100.

For long line communication, the data set adaptor 110 is provided and which is in turn coupled to a data set 116. The information transmitted through the data set 116 is placed upon a suitable long line transmission facility 118 to a remote data set 120. The remote data set 120 may be coupled to a further plurality of facsimile transmission schemes such as the printer 122 and the scanner 124. In accordance with the operation of the Sigma or other types of computers, it is feasible for pluralities of the control units 108 to time share the data path 106, the selective addressing of the controller unit 108 occurring by means of appropriate data bits being supplied to the input-output processor as a result of information stored in the memory 102 and addressed by the CPU 100 in known manner.

The controller 108 interacts with each of associated peripheral units 112 and 114 in accordance with the desired function. Thus, if a printing operation is desired, appropriate control signals from the controller 108 are supplied along a control line to the printer 112. The printer responds by indicating to the controller its appropriate status, signifying the printer is ready to receive data. If the status requirements are satisfied, the controller begins to send video information derived from the CPU along the common data path along the appropriate video line to the printer. In response to the information received by the printer, the information desired is reproduced on an appropriate document. In accordance with one aspect of the invention, the synchronizing signal is supplied on a separate line as will be explained in further detail below.

The operation is the same with regard to the scanner, but with a reverse data flow. When it is desired to derive information from a document, the appropriate controller having been selected along with the appropriate function by means of addressing supplied along the common data path 106, an appropriate control signal is supplied along the proper control line from the controller 108 to the scanner 114. In response, the scanner 114 provides a status signal to controller 108 indicating that the scanner is in position to begin transmitting video data. Video data is then transmitted from the scanner to the controller 108 and back to the CPU along the common data path 106. Again, in accordance with a feature of the invention, the synchronizing signal is provided along a separate line.

An additional feature of the present invention is the use of a remote control indicated generally at 126 directly operable with the printer and/or scanner units for overriding the command function provided by the CPU along the data line 106.

In connection with the foregoing description it will be understood that both print and scan units are LDX printers which may be utilized for either a scan or print function in accordance with the activated inputs.

As shown in FIG. 1, remote printer and scanner units are interconnected through an associated data set over a wide band transmission line to a local data set which interfaces between a data set adaptor coupled to the controller and to a central processor. Other arrangements are obviously utilizable, including remote CPUs interfacing through appropriate signal converters to local CPUs, etc.

The essence of the transmission operation may be defined as the process of entering a source document into the CPU from the scanning unit 114 via the controller 108. In this mode, the controller accepts and time quantizes the scanner's serial video information under the control of necessary supervising and synchronizing signals, converts the information to bit parallel bytes and transfer the parallel data to the selector channel or data path 106 to the appropriate central processing unit 100. The receive or write operation is definable as the process of outputting an image from the CPU to the printer 112 via the controller 108. In this mode, the controller accepts bit parallel bytes from the data path 106, converts such information to serial data and outputs the data in video form to the printer along with the necessary synchronization and supervising control signals. The interfacing requirements between the input-output processor 104 and the data path 106 for appropriate control through the controller unit 108 is set forth in the above-noted booklet, *XDS Sigma Computer Systems/Interface Design Manual*, and generally sets forth those interface requirements necessary for intercommunication with the Sigma series computer. With regard to the interface between the controller 108 and the printer or scanner units, interfacing signals which are set forth include:

*a.* Synchronizing signal (sync) — a control signal provided by the controller to the printer or scanner indicating the initiation of an operation for transmission or reception of video data.

*b.* Video — data signals either applied to the scanner unit for printing or derived from the scanner unit and signifying information scanned.

*c.* Control — signals applied to the printer or scanner and controlling the sequence of operations therein in accordance with the controller circuitry.

*d.* Status — signals derived from the printer or scanner monitoring the various functions in the printer or scanner necessary for the proper operation of either device for the printing or scanning of video information.

II. CONTROLLER ORGANIZATION

With reference now to FIG. 1, the control mechanism is illustrated in greater detail. For ease of illustration, the controller mechanism is shown as interfacing with a peripheral device performing a printing operation, although it will be clearly understood that the same controller arrangement may be employed in conjunction with the scanner as will become apparent from the following description. For ease of illustration, like reference numerals will be employed to indicate like components when applicable.

Thus, as shown, the CPU 100, memory 102, and inputoutput processor (IOP) 104 couples data along the data path 106 to the controller 108. The controller will include a subcontroller 130, the function of the subcontroller being to reduce the data received from the IOP 104 along the data path 106 into appropriate informational divisions to be employed by the remainder of the controller circuit as desired. Thus, the subcontroller supplies a clock signal, data signals, appropriate specific orders, and responds to various status indications. The clock signal may be derived from a suitable high frequency signal supplied from the IOP 104. A typical specification and design for a subcontroller employable in conjunction with a Sigma series computer is illustrated in greater detail in a publication of the Xerox Data Systems Corporation, El Segundo, California, entitled *Model* 7902, *Extended Device Sub-Controller Technical Specifications*, XDS publication No. 980393A, dated November 1970.

The operation of the controller 108 in terms of control of data flow is controlled principally by the operation of the master control counter 132. The master control counter provides specific control signals which operate within the control logic 134 for directing the data flow from the CPU to the printer 112. A buffer 136 is provided for receiving the data along the data bus from the sub-controlled 130, in accordance with signals provided by the control logic 134 and in response to an initiation from the master control counter 132 as will be explained in greater detail hereinafter. The data is entered along the data bus in parallel fashion to the buffer 136 until the buffer is completely filled with data. Data is then transferred from the buffer 136 to a shift register 138 and from the shift register 138 in serial fashion along a video data line to the printer 112. Synchronization is provided directly from the counter 132. Use of the foregoing arrangement allows a greater simplicity in the form of control circuit design, since it is not necessary to provide synchronizing bursts multiplexed in with video data signals along a common data line. The arrangement of the present invention permits separation of the scan synchronization signal from the video data signal in a convenient manner without sacrificing accuracy of reproduction.

The control logic circuit monitors the information flow in accordance with certain conditions. The input conditions to which the control logic 134 is responsive include a plurality of orders received from the central processing unit which govern the operation of the printer. These orders will include functions such as:

*a*. Write — a logic command indicating the printer is to begin a writing operation.

*b*. Cut Mark — an order indicating the printer is to provide marking of the documents containing the information being printed for subsequent sensing and cutting by an appropriate device within the printer.

*c*. Cut Immediate — an order indicating bypass of marking and provide an immediate cut at the end or during video transmission.

*d*. Form Sense — a signal indicating that the video data flow is not to begin until a document is located in the proper position for printing.

*e*. Run/Sync — an order indicating that video data is not to be transmitted until synchronization is assured by means of a supervisory circuit or that the document feeding is to continue.

In response to the orders received by the control logic 134, the flow of data in accordance with the conditions set up by the orders is effected. To the extent that the orders do not affect the flow of data but affect the machine operation, a plurality of output lines are provided from the control logic 134 directly to the printer 112. Thus, the control logic provides the following outputs:

*a*. Run — a signal indicating to the printer that it is to set up to receive video data.

*b*. Cut mark — a signal to the printer indicating that an appropriate mark and cut is to be made after the application of data.

*c*. Cut immediate — a signal is provided to the printer indicating that the printer is to bypass the marking procedure and make a cut immediately following the completion or during transmission of the video data to the printer.

The control logic also operates in response to the receipt of status signals from the printer governing the operation of various aspects of the printer necessary to properly control the flow of information. The following signals are typically provided from the printer:

*a*. Signal R — a signal from the printer indicating that the printer is ready and that the drive is on.

*b*. Form Detect — a signal indicating that a desired document is in proper position to receive video information.

*c*. Fuser Ready — a signal indicating that the necessary devices employed to provide the reproduction in accordance with the video information supplied to the printer is in condition to be used.

*d*. Filament Timer — a signal indicating that sufficient time has elapsed to allow the filament of the beam device employed in the printer to warm up to its maximum efficiency.

*e*. Sweep — a signal indicating that the beam sweep signal employed in the printer is at its proper level.

*f*. General status line — providing signals indicating that paper in the printer is either low or out, or other status signals in accordance with the drum or web conditions.

Additional signals, of course, may be employed to monitor various points within the machine and may be employed directly in the control logic for controlling the data flow between the CPU and printer.

The remote control panel 126 provides certain additional control functions desirable in the controller. Control functions include:

*a*. Stop — a manual signal from the remote control panel in addition to the automatic stop provided from the CPU and operative to cease and prevent the operation of the printer from the CPU.

*b*. Start — a signal permitting the automatic operation of the printer by the CPU.

*c*. Reset — a signal for resetting the printer directly in addition to the automatic reset operation of the CPU.

*d*. Cut immediate — a manual signal for providing a cut immediate to the printer and performing the same operation as the cut immediate signal provided from the control logic 134 in response to a computer initiated cut immediate signal.

*e*. On/Off — a signal effecting the application of removal of power from the printer.

III. OPERATION

The discussion that follows is a detailed description of the input operation covering the flow of data from a CPU to a printer. During the discussion, certain components which may be apparently internal to either to sub-controller or to the printer unit will be understood as forming no part of this invention. For disclosure and discussion of these internal components, reference is again made to the aforementioned booklet describing the construction of a typical sub-controller, model 7902 manufactured by the Xerox Data Systems, and to the U.S. Pat. Nos. 3,149,201 and 3,303,280 which describe the LDX circuitry employable as the printer or scanner units as described herein.

The operation begins either by means of a start signal supplied from the remote control panel 126 or by derivation of a data start signal received along the data path 106 from the CPU 100 through the IOP 104, and a write order received from the CPU and provided by the sub-controller 130 along the order line indicating a write order to the control logic 134. In response to the write order, the control logic issues a run signal along the run line to the printer. Data is provided along the data bus typically in the form of a parallel by byte along a plurality of data lines forming the data bus and transferred into the buffer 136 in parallel fashion. The buffer 136 is provided with a predetermined date byte capacity. The control logic 134 operates in response to the write order for providing a data request signal to the sub-controller. In response to an indication that data is ready in the sub-controller, an instruction to the buffer 136 is provided along the load buffer line to being loading data along the data bus. The rate at which data is provided to the bus is indicated by the master control counter 132 to the control logic 134 along the data rate line. When the buffer 136 is full, an appropriate signal appears along the full buffer line from the buffer 136 to the control logic 134. Meanwhile, assuming that all printer functions are satisfied by means of the appropriate signals received from the printer in response to the run signal along the input lines to the control logic 134, an appropriate logic condition is set up within the control logic 134. At this point, with the full buffer signal being present and in synchronism with the scan sync signal derived from the counter 132 and applied along the scan rate line to the control logic 134, a data transfer signal is applied along the transfer line to the output of the buffer 136, and thereby transferring the buffer content into the shift register 138.

An appropriate signal is supplied from the counter 132 to the shift register 138 along the video rate line which operates to continuously shift information in the shift register 138 along the video data line to the printer 112. However, since no information has been present in the shift register significant of video data, the shifted contents of the register 138 appearing along the input to the printer has no informational content until the initiation of the transfer signal. Thus, the buffer register contents are printed at the beginning of the first scan line in synchronism with the scanning sync signal. When the buffer is empty, the absence of a full buffer signal condition along the full buffer line triggers the load buffer signal along the load buffer line from the control logic to the buffer 136 and the load cycle repeats itself. Video data is thus continuously sent to the printer until the end of the scanned data line is detected by the control logic. The end of the line is provided by means of an appropriate pulse derived from the counter 132 along an end line path to the control logic 134. Transfer signals are inhibited by the end line signal for a time period sufficient to enable the printer to retrace to the start of the beginning of the next successive line. Data transfer is then reinitiated and successive scans continue until the specified number of data bytes have been transmitted. Detection of the specified member of data bytes is provided by means of control logic sensing conditions of the data rate line and the full buffer line, and providing an appropriate logic shutdown signal in response to the appropriate coincidence of conditions indicating an end of data transmission.

The scanning operation although not specifically set forth in the interest of clarity will be self evident from the foregoing description. The scan operation operates in precisely the same manner except that the video data is derived from the scanner and serially fed into the shift register 138 for transfer to the buffer 136 in accordance with the same logic control signals that govern the transfer of the information from the buffer to the shift register in the printing operation. Again, transferring information from the buffer through the sub-controller occurs along the data path 106 to the CPU 100 takes place in precisely the same manner but in the opposite direction with regard to a print operation.

The counter 132 includes provision for deriving a test pattern from various count positions. The test operation is determined by means of an appropriate order applied to the control logic which will shut down the data flow operation and activate the TEST module 140 so that the video data will be inserted from the test module 140 as derived from the desired counter stages into the output portion of the shift register 138 As a result, the test pattern is shifted into the printer along the video data line.

The foregoing general description of the operation of the controller will be now explained in further detail with reference to those specific components of the controller performing critical operations.

IV COMPONENTS

A. Buffer — With specific reference to FIG. 3, the manner wherein the data is entered from the subcontroller through the buffer and shift registers will now be set forth in greater detail.

The organization of the buffer 136 is such as to provide a controlled transfer of parallel information by byte into serial by bit data. The organization generally includes a buffer register illustrated generally as 152 and including four stages numbered 1, 2, 3 and 4. Control of the loading of the four stages is effected by means of a four stage ring counter 154. The buffer 136 further includes a transfer gating network 156 intercoupling the buffer registers 152 with a shift register 138. The use of four stages presumes a four byte load. Obviously, greater or lesser numbers of buffer register stages may be employed to accommodate varying byte loads.

In operation, data is fed along the data bus 150 in a parallel by byte fashion. For purposes of illustration, an eight bit data line is assumed, and a byte of eight bits is therefore provided along the parallel lines of the data bus 150. The information is released from the subcontroller in a four byte sequence, each successive byte being loaded in the appropriate stage of the buffer register 152. Control of the loading is effected by means of the ring counter 154 which responds to a load signal applied to the input line 158 to place the ring counter in its first condition enabling a gating signal to be applied along the output line 160 from the first stage 162 of the ring counter 154, thereby placing the buffer register stage number 1 in its load condition. The first byte therefore fed along the input lines 150 is loaded into the first buffer register stage corresponding to byte 1. The next successive signal along the line 158 shifts the ring recounter to its second state, thereby providing an output line along the line 164 enabling the buffer register stage 2 to load the corresponding byte 2. As a result, when the second successive byte is placed along the data input lines 150, it is loaded into the second successive register. The operation repeats until all four register stages have been loaded, at which time a full signal is provided by the last stage 166 of the ring counter 154.

When it is desired to reset the ring counter 154, an appropriate reset pulse is applied along the ring counter reset line 168, thereby resetting the ring counter 154, so as to enable it to repeat the load process at the next successive cycle.

When each of the bytes 1, 2, 3 and 4 are loaded into the respective buffer registers 152, the buffer registers are in their fully loaded state and a full signal is generated to the control logic circuit 134. Accordingly, upon satisfaction of the other conditions governing the transfer of data, an appropriate transfer signal is generated by the control logic 134 and applied along the line 170 from the control logic to transfer gates 156 for effecting the transfer of data from the buffer register 152 to the shift register 138. As was explained in connection with FIG. 2, the video rate shifting pulses which are applied along the line 172 to the shift register 138 serve to shift the information serially out of the shift register along the video data line 174 for utilization in the printer 112. The operation of the video rate shift is such that pulses are continually supplied along the line 172 for serially transferring information out of the shift register 138 along the data line 174. Prior to transfer, however, the information contained in the shift register is devoid of data relating to video and therefore video data line 174 does not contain valid information. This is signified by a series of binary zeros constituting the content of the shift register prior to transfer. Thus, binary zeros are continually shifted out along the line 174. Upon the proper moment of transfer, information in the buffer regiser 152 is transferred by the transfer gates to the shift register in parallel fashion and the video shift pulse, applied along the line 172, continues the shifting action of the shift register 138 so as to effectively transfer the video data out along the output line 174 to the printer.

It is noted that the video data is shifted out along the line 174 in the same sequence as the information is received along the data bus 150. The action of the transfer gates, therefore, upon receipt of information corresponding to load byte 1 at an area designated as input area 1 along the transfer gate 156, is to transfer this information to the other end of the shift register 138 so that when video data is shifted out of the shift register, it will be shifted out in a sequence whereby byte 1 will be transferred first, byte 2 second, and so on. Thus, each successive byte supplied to the transfer gate is placed into the shift register at a location corresponding to the position corresponding to the input sequence. Transfer gate 176 is conventional in its nature, and may constitute a plurality of coincident AND gates activated by means of the transfer signal. The data rearrangement is merely a matter of proper interconnection of the respective outputs of the various gates constituting the transfer gate.

B. Counter — referring now to FIG. 4 the operation of the master control counter 132 is illustrated in further detail. As was described above, it is the function of the master control counter to provide scan synchronization, the end line count signifying the end of the video information scanning line, and other control timing functions. Thus, the master control counter is illustrated generally as 132 includes counter unit 180 which may be a conventional chain of flip-flops arranged as a binary scaler having a number of stages sufficient to encompass the counting rate desired in the data format employed. Prior to the counter unit 180, a bistable network 182 consisting of a first flip-flop 184 and second flip-flop of 186 interconnected so as to form a two stage counter, is employed. The bistable network is interconnected with the counter unit 180 so as to effectively form a first and second counting stage prior to the counter 180. A reset flip-flop 188 is used to provide a master counter reset signal MCReset along the output line 190 in accordance with attainment of a predetermined count by the counter unit 180. The reset may be accomplished by wiring the appropriate counter stages corresponding to the desired final count to a coincident gate 200 for triggering the reset line.

In operation, a clock signal is provdied along an input line 192, resetting the reset flip-flop 188 and providing input pulses to the two-stage counter 182. The two-state counter 182 provides the output pulses corresponding to the video rate shift pulses along the line 194, these pulses corresponding to the video rate shift pulses applied to the shift register 138, as described in FIG. 2. The shift pulses are also applied along the line 196 to the count input C of the counter unit 180.

Figure 2:
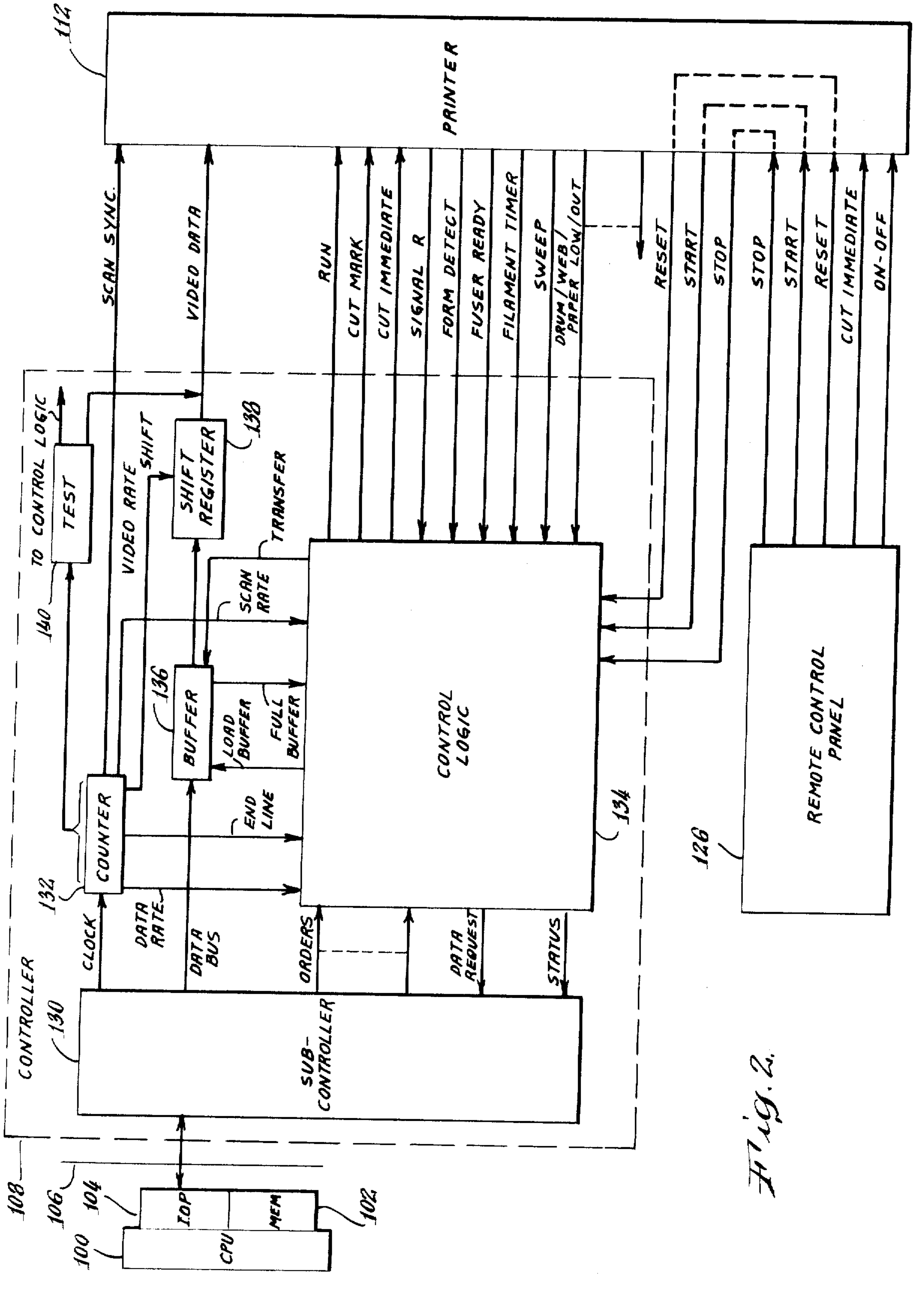
FIG. 2 is a block diagram illustrating the specific elements of the controller unit interfacing between the central processor unit and the facsimile system.

The counter unit 180, which as stated above is a chain of flip-flop stages connected as a binary counter, is provided with a plurality of taps at various stages corresponding to the desired count patterns. Thus, a first output C0 of the counter unit 180, utilized as will be explained in further detail below, is applied along the line 198. A second output C1 of the counter 180 corresponds to the data rate signal utilized by the control logic 134 for the purpose described above in connection with FIG. 2. The operation of the data rate signal as a buffer capacity count control will be illustrated in further detail in connection with the description of the control logic circuitry 134 below. Three additional outputs of the counter unit 180, C2, C3, and C4 are employed to provide a test pattern. The test pattern function, discussed briefly in connection with FIG. 2, provides a convenient means for deriving a plurality of binary bits at a desired count level which may be employed to test the video input of the printer in a specific pattern. The output stage C5 of the counter 180 corresponds to the end line count and is used to provide a scan sync pulse to the printer as is described above in connection with FIG. 2. The resetting function of the counter, shown generally by counter output C6, is merely a function of arranging the counter stage outputs such that the counter, upon reaching any given state, determined by a coincidence of signals of the input at the coincident AND gate 200, will provide a resetting pulse to the reset latch 188 causing a reset pulse to appear along the line 190. The reset pulse 190 is utilized by the control logic for a variety of functions, and is generally indicated as the scan rate signal shown in FIG. 2. The counter unit 180 is itself reset by a pulse derived from the not reset line of the gate 188 through the inverter 202 to the reset input R of the counter 180, thereby effecting a reset of the counter unit 180.

Figure 4:
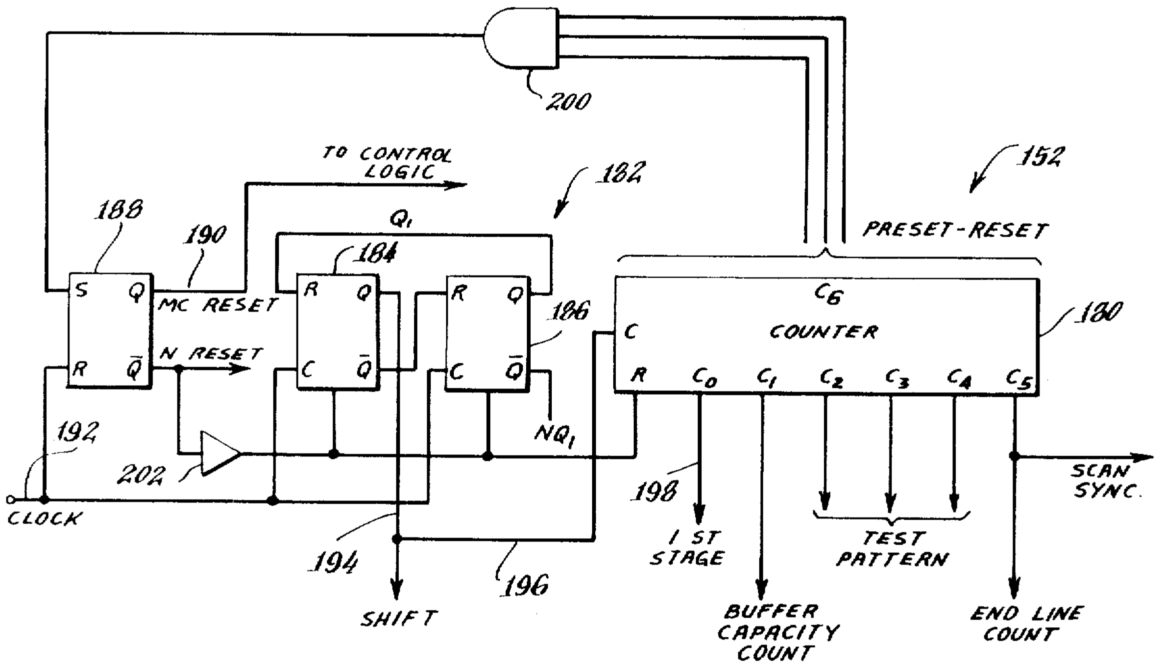
FIG. 4 shows a detail of the logic circuitry of the control counter.
Figure 4A:
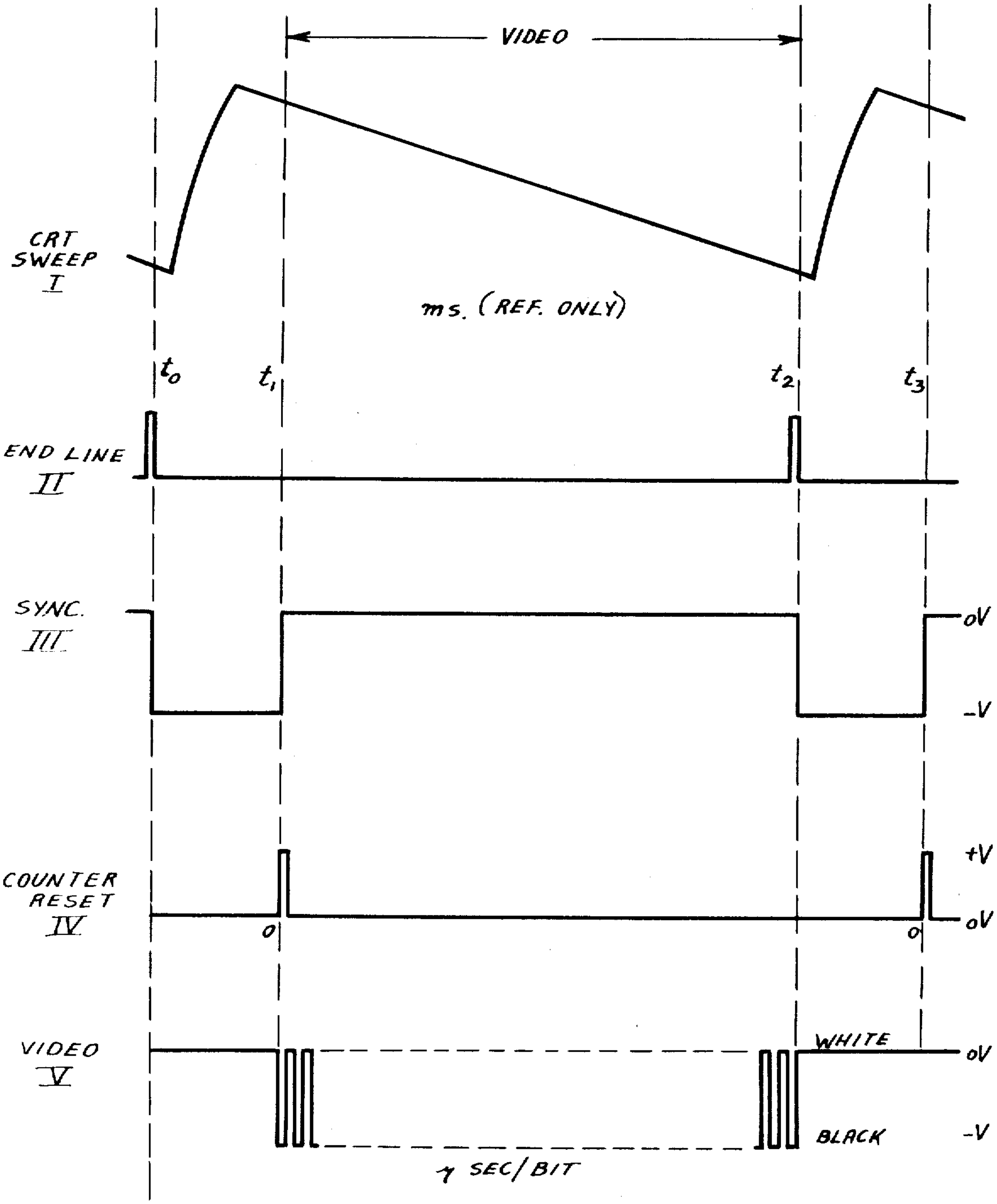
FIG. 4A is a wave form and timing diagram illustrating the relationship of the synchronization and video data pulses.

With reference to FIG. 4A, the operation of the master control counter of FIG. 4 is illustrated in conjunction with the relationship between the video data and scan sweep wave forms. As shown, curve I of FIG. 4A illustrates the video sweep signal applied to the cathoderay tube (CRT) employed as part of the printing operation typically found in an electrostatographic facsimile printer unit such as the LDX. The initial period of the sync signal between times *t*0 and *t*1 is typically of a duration necessary to enable the sweep signals to reach the magnitude necessary to position the CRT beam at the beginning of a scan. Time t1 is therefore equivalent to a master counter count of zero. During the duration of the sweep from *t*1 to *t*2, the video data shown in curve V of FIG. 4A is transmitted in the form of binary bits representative of either black or white information along the video data line. The counter is set to provide an end line counter signal at a count defining the end of the video data stream at a point less than the maximum capacity of the count, the end line pulse position being shown in curve II. Synchronized with the end line signal, the sync signal is again turned off to provide blanking during the period necessary for the CRT beam to retrace. This time period, from *t*1 to *t*3 corresponds to the reset period of the counter as shown in curve IV.

C. Control Logic — The control logic unit 134 illustrated in FIG. 2 will now be described in greater detail with reference to FIG. 5. The explanation of the control logic will be provided in terms of each of the more critical functions determined thereby:

1. Data Transfer

Initiation of a data operation requiring data to be transferred form the computer to the printer is controlled by appropriate orders provided at the input of the control logic circuit along the lines illustrated generally as 220 to a decoder 222 which performs the function of selecting an appropriate output line in accordance with the desired input order. Although shown as occupying a plurality of individual input order lines, it is conventional that the input order be a binary coded data word which is translated by the decoder into a one out of n selection, wherein the individual output line selected determines the particular order provided.

As stated above, an initiating order such as a write order, appears along line 224 and is coupled to the OR gates 226 and 228. The signal to the OR gate 226 is applied as a reset to the Run latch 230 and sets the write latch 232. Setting the write latch 232 causes the Q output of the write latch 232 to go high, thereby providing an output signal through the OR gate 234 along the line 236, and thus providing a run signal to the printer as described in FIG. 2.

In response to receipt of a run signal, as was described above, the printer 112 provides a series of status signals to a status operation unit 238 within the control logic. These status signals are received by the status operation unit 238 along the input lines indicated generally as 240, and applied to the input of suitable coincident AND gate 242 coincident with a start signal applied along the input line 244. The operation of the status operation unit 238 will be described in further detail below. Coincidence to the input of the gate 242 indicates each of the status signals are of proper polarity and, coincident with the start signal 244, results in an output signal applied along the output line 246 of the OR gate 242. Each of the status lines 240 may be separately applied along the status bus 248 for application to the subcontroller as shown by the status bus line emerging from the control logic 134 in FIG. 2. The function of the status bus will be to provide a separate indication to the subcontroller unit for appropriate notification by means not illustrated of a failure of any one of the given status signals and therefore its associated function, as described above.

Upon indicating proper status along the line 246, a high signal is applied to the gate 250 in coincidence with a timing signal derived from the first stage of the counter 180, *c*0, along the line 198. The resultant high signal is passed through the OR gate 252, thereby providing the LCreset signal which is in turn applied to the input line 168 of the ring counter 154 utilized in the buffer 136. Meanwhile, the high signal from the output to the write latch 232 has been applied to the AND gate 254. The AND gate 254 receives a corresponding coincident input, which is derived from the full signal output of the stage 166 of the ring counter 154 in the buffer 138, and applied along the line 256. The signal is inverted in the inverter 258 and applied as a coincident input to the gate 254. Since no data has as yet been transferred, the full line 256 is low, the inverter 258 converting the low signal to a high signal which is applied to the gate 254 in coincidence with the high signal from the write latch 232, thereby enabling a high signal at the output of the gate 254 to the input of the OR gate 260. The corresponding high output from the OR gate 260 is a data request signal which is applied to the subcontroller as shown in FIG. 2. In response to the presence of data, the subcontroller responds by activating the data enable input 261 of the gate 235, thereby applying a load signal to the load line of the ring counter 154.

Setting of the write latch 232 resulting in a high output from the Q line of the write latch is coupled to the AND gate 235 which receives a further coincident input from an order enable line 237. Since each of the orders 220 will be accompanied by an order enable signal 237, indicating the validity of an order, the coincidence of an order enable pulse along the line 237 coupled to the AND gate 235 and a high output of the write latch 232 will result in a load signal portion applied to the load input line 158 of the ring counter 154 portion of the buffer 136.

Figure 3:
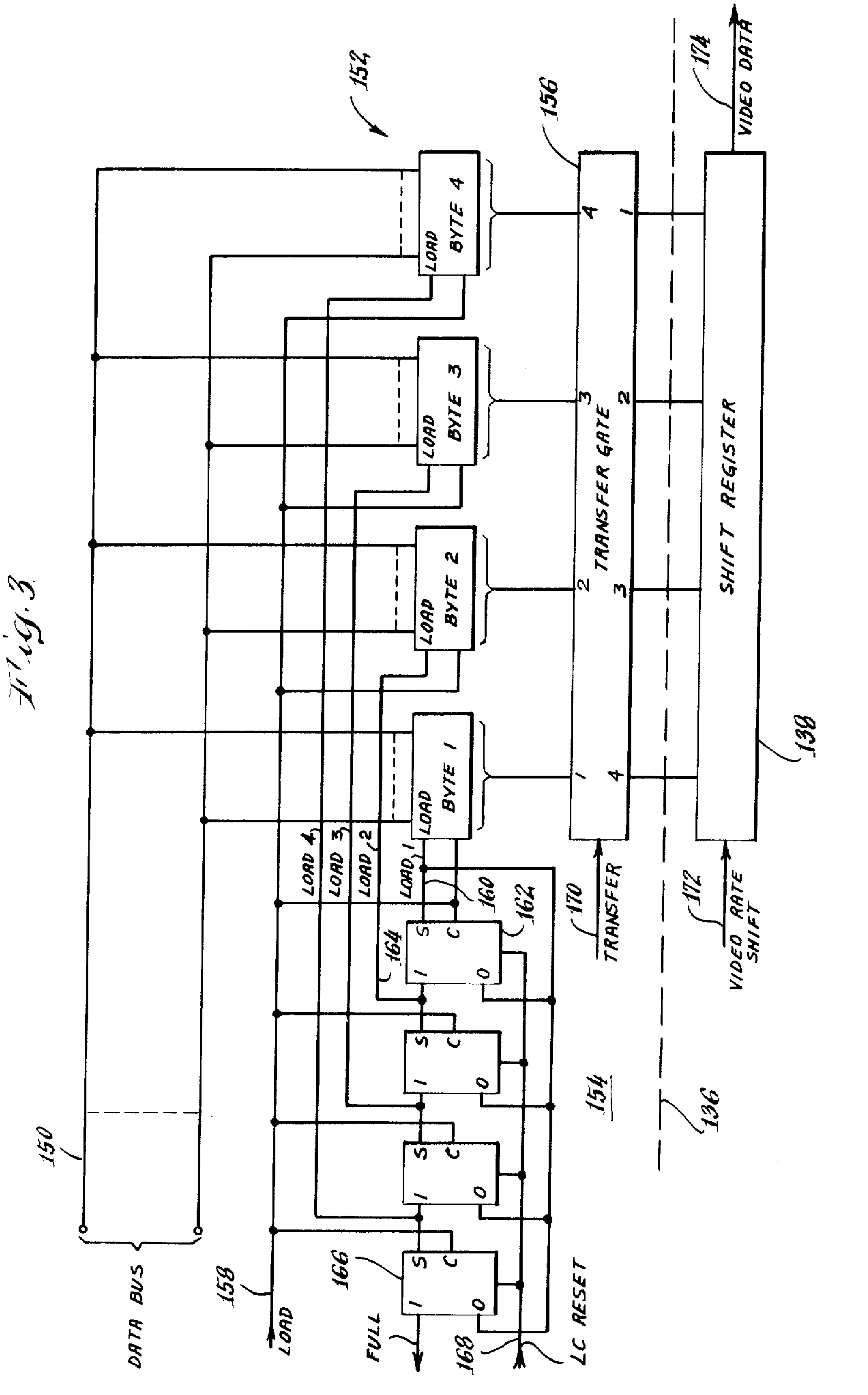
FIG. 3 illustrates a detail showing the logic circuitry of the data entry buffer and shift register.

The ring counter will respond by loading data in accordance with the description set forth above in conjunction with FIG. 3. An additional input Form P may be provided to satisfy a form sense order which will be described in further detail below. Assuming the presence of all the coincident signals necessary to gate 262, the presence of the master counter reset signal causes the output of the gate 262 to go high, setting the latch 264, and resulting in the Q output of the latch 264 going high. The high Q output of the latch 264 is an indication that the system is sync and that data can be transferred by a transfer pulse. Coupled to the Q output of the latch 264 is an AND gate 266 receiving coincident inputs from the high side of the latch 264 and from the high side of the latch 268. The latch 268 is used to proved timing signals for effecting the four byte data transfer corresponding to the buffer storage capacity as was described in conjunction with the preferred embodiment of FIG. 3. Thus, in accordance with the specific illustration used, the master control counter is tapped to provide signal multiples of four bytes of eight bits apiece, thereby sending a transfer pulse corresponding to every 32 bits in order to provide proper synchronization to the transfer. In the implementation shown, the 32 bit rate signal is rendered as a result of a high output from the AND gate 266 in accordance with the high output of the latch 268. The latch 268 is pulsed by providing a tap from the counter in proportion to the desired transfer of data rate, as output tap C1 from the counter 180. Thus, if the transfer rate requires a transfer for each 32 bit sequence of information, the binary stage corresponding to C1 would be the output of the fourth binary stage, corresponding to a pulse for each binary count of 16, provided into the clock input of the latch 268. The divide by two action of the latch 268 results in the high side Q of the latch 268 going high for every 32 bits. Thus, a transfer pulse appears from the output of the latch 268 in accordance with the desired transfer point, indicating a full 32 bit sequence for transmission. The output of the gate 266 is applied along the transfer line, corresponding to line 170, to the transfer gate 156 in the buffer unit 136 as shown in FIG. 3.

In order to improve the accuracy of the timing circuit, an additional coincident AND gate 270 is utilized to gate the C1 pulse with a signal corresponding to a pulse edge occurring just prior to the end of the C1 pulse edge. This is provided by tapping the NQ1 side of the two stage counter 182 and gating same with both the Co output of the counter unit 180 and the high output of the latch 268 through a further coincident AND gate 272.

2. Logic Shutdown

The setting of the latch 264 will result in a logical one input to the AND gate 280. The AND gate 280 is also receiving a logic input from gate 254 corresponding to an indication that the buffer register is not full and that the write latch is still set. The resultant output from the AND gate 280, indicating that the latch 264 is set under these conditions, will set the latch 282. With the latch 282 set, the AND gate 284 will respond to a coincidence of an output from the latch 282 and a signal corresponding to a transfer pulse received from the output of the latch 268. From this indication, indicating that the master counter control has counted signals corresponding to a full 32 bit series, but that the buffer register is still not full, that is provided an indication that insufficient data has been transferred in accordance with the data request from the output of the OR gate 260, thereby signifying the end of a transmission. In this case, the high logic output from the AND gate 284 passes the logic OR gate 286 and is sent out along line 288 whereas it is applied to the OR gate 290, indicated on the left side of the figure. Passage of the signal through the OR gate 290 applies an LCreset signal through the OR gate 252 along the line 168, and also provides a reset signal to the write latch 232. Resetting the write latch 232 causes the run signal to go to its low condition. Thus, the logic is shut down, and the printer run signal reset.

An additional feature of the control system is a monitor for unusual data endings. When the data request produces insufficient data, as described above, the gate 286 provides a shut down. The end of data would normally also signify the absence of an order enable signal. If data request is unfulfilled in the presence of an order enable signal however, an unusual end of data is indicated. This is accomplished in the logic circuit of FIG. 5 by providing an additional coincident AND gate 274 responsive to both a logic shut down signal from gate 286 and an order enable pulse for supplying an unusual and indication. The unusual end signal (UNE/DATA) may be applied to the subcontroller as an additional one of the status signals, as shown in FIG. 2.

3. Run Synchronization

For long data runs, it is desired to insure that synchronization is maintained. Application of a run/sync order along the input 220 will accomplish this function. The decoder unit 222 decodes a run/sync order by applying a set pulse to the run atch 230, to the write latch 232 and to the NAND gate 294. The NAND gate 294 is also receiving an inverted full signal through the inverter 258 from the full signal line 256. The output of the NAND gate 294 therefore is a logic not run full signal. In addition, an inverter 296 is provided with an end line signal derived from the counter stage C5, as shown in FIG. 4, and is applied as an not end line signal to the NAND gate 298. The resultant signal derived from the NAND gate 298 is applied to the reset input of the latch 264 and maintains the latch 264 in its reset condition until an end line signal is received. In this manner it is insured that the latch 264 is maintained in a reset position until the video data transmission ended before allowing the normal operation of the circuit to take place as described above.

Computer generated reset signals may be derived from the data provided from the CPU by applying an appropriately decoded signal to the OR gate 300. As a result of the application of computer generated reset signals to the logic gate 300, a reset signal is applied to the run latch 230 through the OR gate 226, thereby terminating the run operation. It should be noted that the use of the run/sync order maintains the run latch in its on condition past the end point of the data flow, since the logic shutdown 288 effects only the write latch 232. In this condition, the printer will continue to operate, such as by slewing paper, until a subsequent order is received or a computer reset is applied. It should also be noted that a manual reset override may be provided for performing the same function by providing a signal through the logic gate 300. The manual reset may also be employed to turn off the printer by creating an equivalent of a logic shutdown pulse through the OR gate 290.

As an additional check on operation, a further AND gate 302 is provided. Since each order signal 220 is accompanied by an order enable signal occurring along the line 237, the appearance of an order enable signal without the accompanying order signal will trigger an invalid order signal from the decoder along the line 304. The presence of an invalid order along the line 304 in coincidence with an order enable signal appearing along the line 237 will result in an output from the AND gate 302 which will be fed through the OR gate 286 giving rise to a logical shutdown along the line 288.

In addition, a computer generated reset signal applied along the input of the OR gate 286 will also give rise to a logical shutdown signal along the line 288. As described above, the presence of a logical shutdown signal appearing from the output of the OR gate 286 in coincidence with an order enable signal generated along the line 237, indicates some form of defect since the logical combination of the two signals would normally not be called for. The unusual end, signified as UNE/-DATE, may be fed along the status bus to the subcontroller for providing an indication to the CPU that a defect has occurred in operation.

Figure 5:
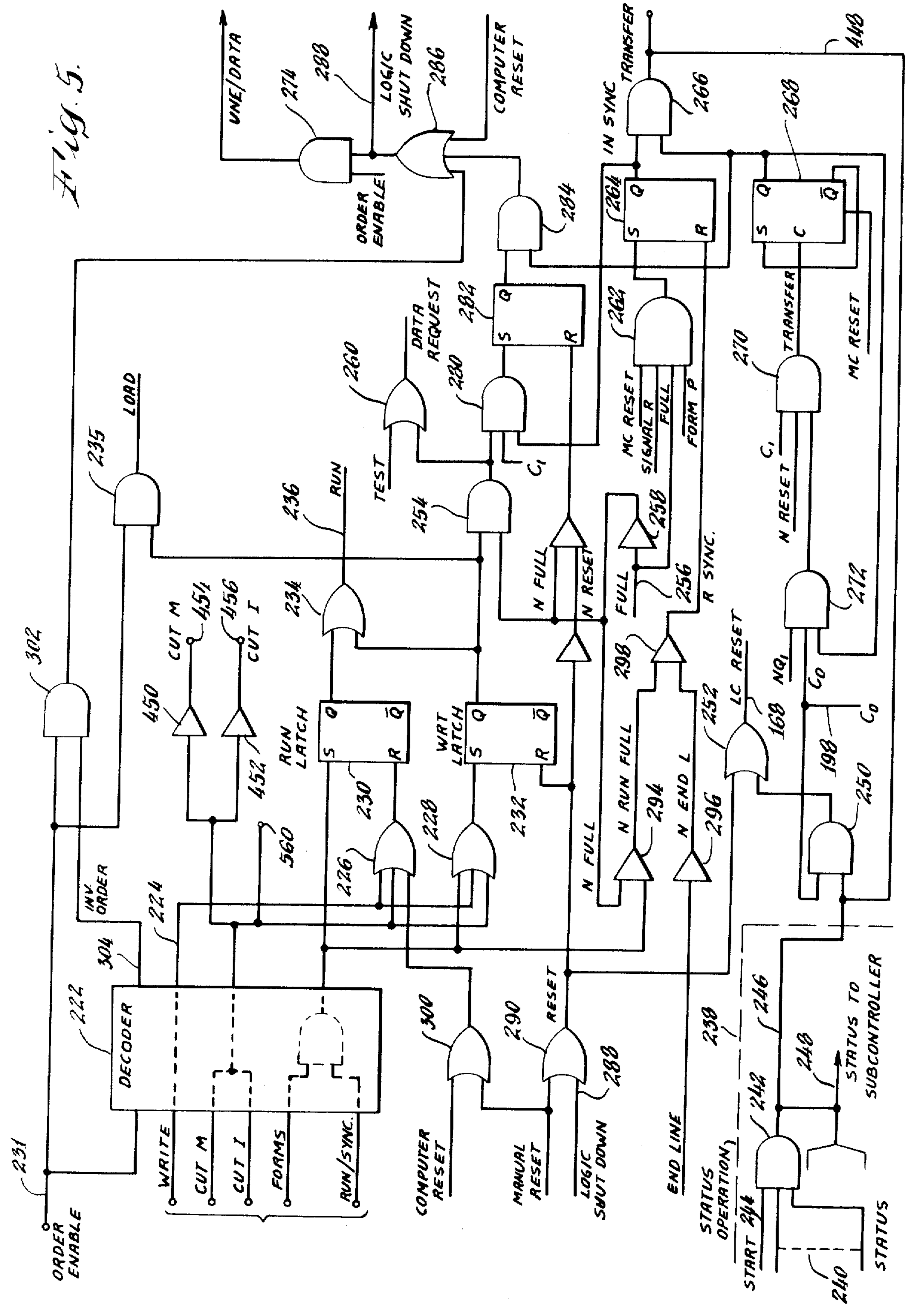
FIG. 5 shows a detail of the logic circuitry employed in the logic control.
Figure 6:
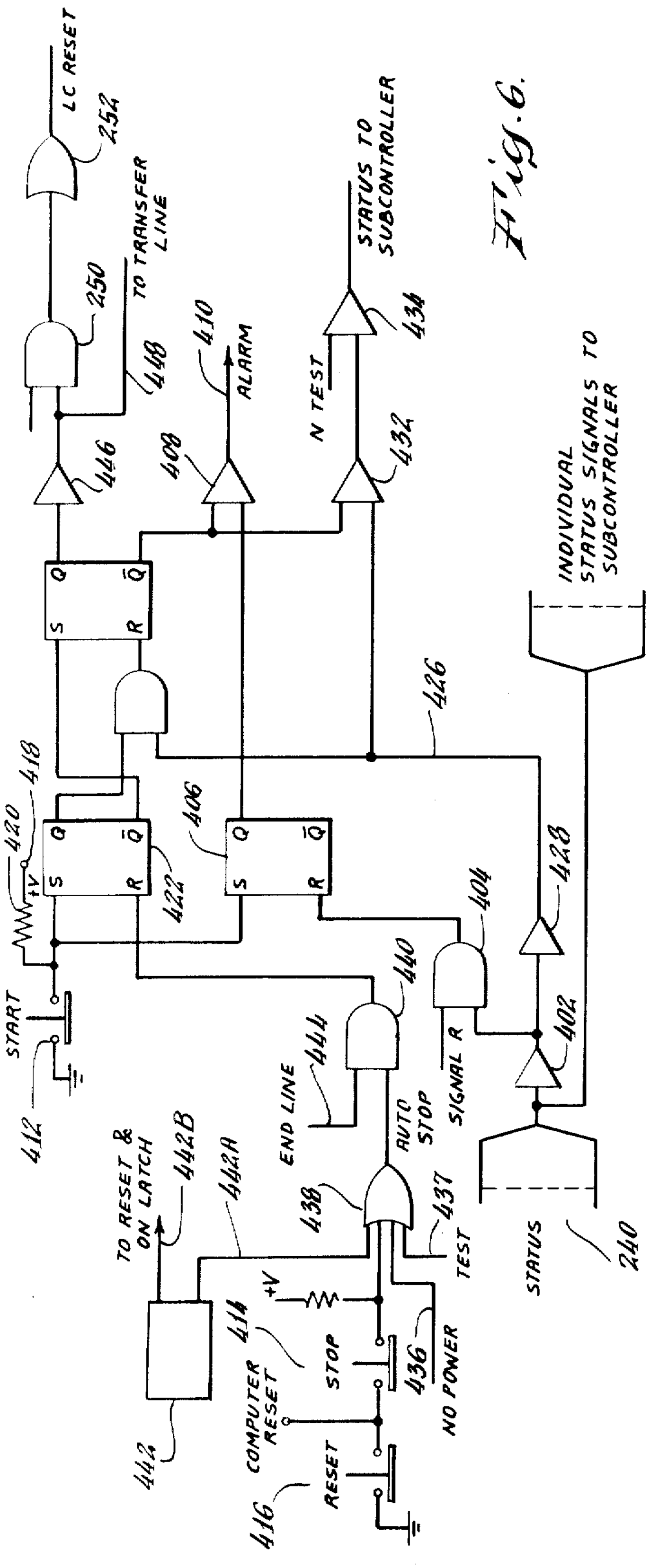
FIG. 6 is a detail of the logic circuitry of the remote control and test override.

D. Stated Operation and Manual Control — The status operation unit 238 of FIG. 5 is shown in the detail of FIG. 6. The status signals are provided along the input status group 240 through an inverter 402 to one of the coincident inputs of the coincident AND gate 404. The remaining coincident input of the gate 404 receives signal R indicating the printer to ready to run. Absence of one of the status conditions to the inverter 402 results in coincidence of high signals of the input of the gate 404 thereby resetting the latch 406. In response to the resetting of the latch 406, the high side Q of the latch 406 will provide a low output to the NAND gate 408 which will in turn provide a high signal as an alarm along the line 410. The alarm condition can be relayed to the subcontroller along the status bus for processing by the CPU.

The remote control panel includes a start push button 412, a stop button 414, and a reset button 416. The buttons are each of the normally closed variety. Activation of the start button 412 places a high input from the source 418 through the resistance 420 to the set input of the latch 422, placing the AND gate 424 in a condition to receive a status signal along the line 426 indicating that each of the status lines 240 is in a properly high position and thus indicating a satisfactory condition. The status signals are inverted in the inverter 402 and reinverted for purposes of line 426 through the inverter 428. Coincidence of inputs to the AND gate 424 resets the latch 430. As a result, the high signal derived from the not Q output of the latch 420 is applied to the NAND gates 408 and 432. Assuming no status low signals, the resultant low output from the gate 432 is applied to the gate 434 and results in a high level or operate signal to the subcontroller along the status bus.

The circuit further includes means for activating a partial logic shut down for preventing the automatic transfer of data by not resetting the ring counter of the buffer for recycling, and by inhibiting the transfer line. The shut down functions are set into operation by a stop activation, activated by means of the stop push button 414, reset activated by means of a reset push button 416, a no power signal appearing along the input line 436, or a TEST signal on line 437 to the OR gate 438. Each of these produce an automatic stop signal for effecting the shut down by driving the coincident gate 440. In addition, a switching circuit 442 is provided for switching automatic to manual operation which operates in the same manner by providing an input to the OR gate 438, along the line 442A, and applying a reset pulse to the run latch 442B. The operation effecting logic shutdown with the appearance of a logic high signal from the OR gate 438 signifies the effect of an input placed thereon. When this signal is applied coincident with an end line pulse appearing on the line 444, signifying the end of an automatic prior video data transmission, the AND gate 440 provides a reset pulse to the latch 422. Setting the latch 422 results in a high signal from the not Q output thereof, acting in turn to set the latch 430. As a result, the latch 430 provides a high signal through the inverter 446, which is coverted thereby to a logic low signal, and thus results in a loss of coincidence at the input to the AND gate 250. As a result, the ring counter unit in the shift register 136 does not reset due to failure of the appearance of the reset pulse, gate 250 effectively being locked, thereby preventing further loading of data. At the same time, the logic low signal along the line 448 serves to clamp the transfer line and inhibit the operation of a transfer pulse. The latter connection is shown in FIG. 5 as the transfer line emerging from the lower input of the AND gate 250. The effect is thus to clamp the transfer line directly to the low logic state represented by the high side output of the latch 430, thereby preventing transfer of data.

The foregoing effect is overcome by activation of the start button 412. As a result of such activation, the latch 422 is set, and the latch 430 reset. Resetting of the latch 430 produces a low signal to the inverter 446, and the resultant high signal is applied both to the line 448 and the gate 250, thus unblocking the load ring counter reset and removing the transfer line inhibit.

E. Test — As was described in connection with FIG. 2, the counter unit 180 may be provided with a plurality of output taps which are used to place a sequence of digital information corresponding to a desired video pattern along the video data line for providing a pattern test to the printer. The test unit 140 is set into operation by means of a computer generated command or by a manually generated override. In either case, the effect is to provide a substitution of the local counter generated pattern data for the video data from the subcontroller 130.

In operation, with reference to FIG. 6, the TEST activation command acts to first cease the computer generated data flow by providing an input signal along the TEST line 437 to the OR gate 438, thereby effecting a partial logic shutdown. This operation is as was described in connection with the automatic stop sequence explained in subsection D above.

The data is entered by gating the counter pattern output to the last stage group of the buffer registers in conventional manner. The logic operation is re-initiated, as by pressing the start button. The transfer pulse is applied, and the data now stored in the buffer, corresponding to the local counter generated test pattern, is transferred, by means of the transfer pulse activating the transfer gate, to the shift register, and to the printer by virtue of the continuously applied shifting pulses as described above.

F. Cut sequences — Referring again to FIG. 5, two cut orders are employed in conjunction with the operation of the logic circuit. These include cut mark (CUTM) and cut immediate (CUTI). With regard to logic circuit operation, each of the cut mark and cut immediate signals appearing in the binary data order presentation along the input lines 220 are decoded by the decocer 222 and are applied by means of appropriate inverter gates, 450 and 452, to terminals 454 and 456, which are in turn conveyed to the printing unit. The effect of the cut mark cut immediate signals will be explained further in greater detail with reference to FIG. 7. The cut mark and cut immediate orders perform all of the functions of a write order in that each of them derive a signal from the decoder passing the OR gates 226 and 228 for respectively resetting the run latch 230 and setting the write latch 232. They also provide the additional signals indicating to the printer the cut mark or cut immediate function.

Figure 7:
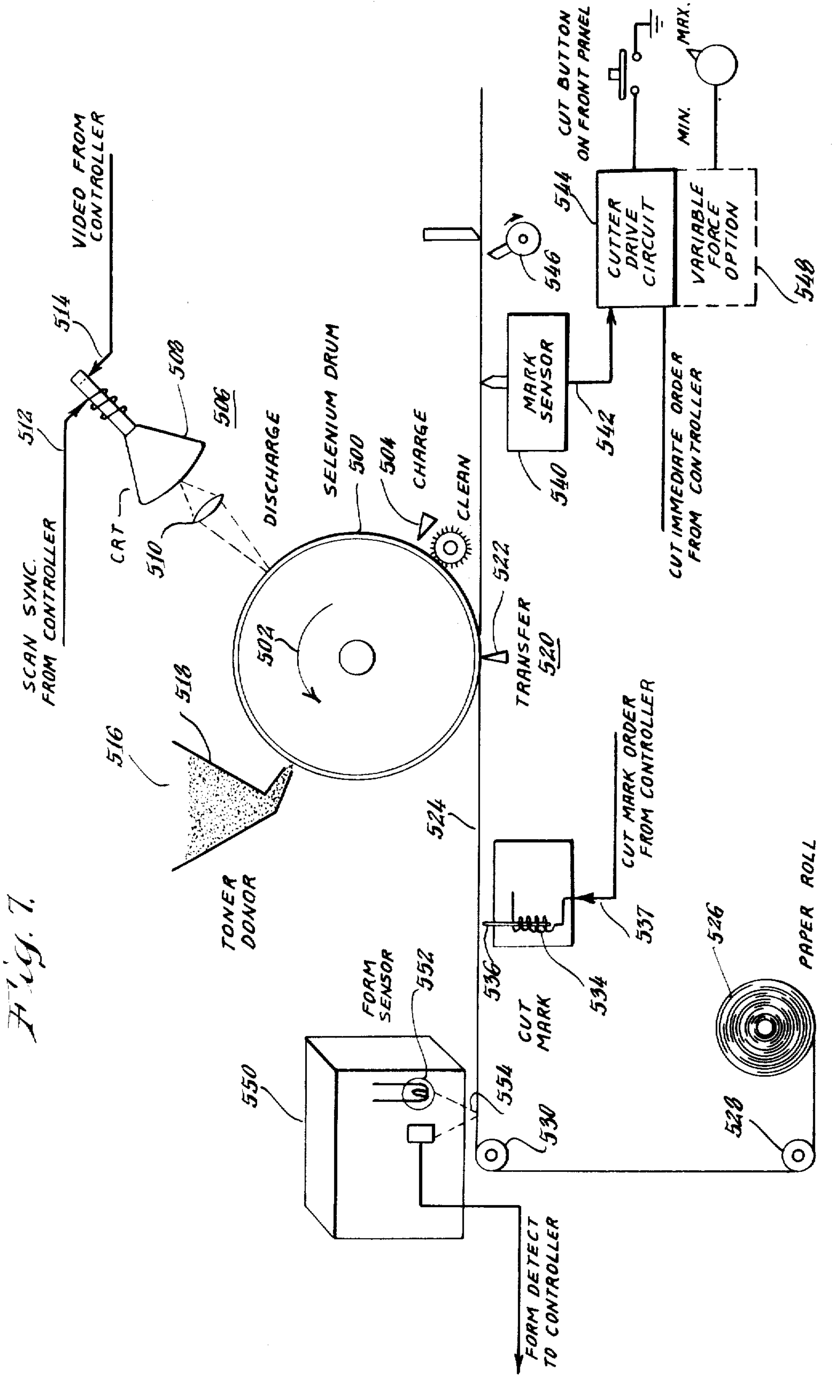
FIG. 7 is a detail of the cutting response mechanism employed in a typical facsimile system.

As is illustrated in greater detail in FIG. 7, the implementation of the cut mark and the cut immediate is shown. The detail of FIG. 7 is a general presentation of a reproduction format, and is intended to represent a typical configuration for reproduction or scanning employing electrostatographic reproduction in conjunction with a cathode ray tube scanner. It would be obvious, however, that the reproduction process is not significant insofar as the concept of the present invention is concerned but is merely illustrated here as one form of preferred embodiment. A full description of an LDX system such as may be employed in conjunction with the foregoing description is illustrated in greater detail in the aforementioned U.S. Pat. Nos. 3,149,201 and 3,303,280.

With reference to FIG. 7, a typical electrostatographic printing operation is shown for illustrating the use of the cut mark and cut immediate functions of the present invention. As shown, a photoreceptive surface, such as a drum 500 rotating as indicated in the direction of the arrow 502, is provided with an initial charge by means of a suitable charging device 504. The charged surface rotates to a position beneath the discharging station indicated generally at 506 and which includes a cathode ray tube 508 generating a beam 510. The beam is deflected by means of a sweep signal under the control of a scan sync provided from the controller along the line 512. Video data signals are supplied from the controller along the line 514 during the scanning cycle, as was described above, and provide intensity modulation of the beam. The selective activation of the CRT beam 510 by means of the video signals provides selective discharge in image configuration on the surface of the rotating drum 500. Subsequent to the selectively discharging of areas formed in image configuration on the surface of the drum 500, a suitable reproducing medium such as toner 516 is provided to the drum by means of a suitable applicator device 518. The toner, bearing triboelectric properties with relation to the drum, will adhere to the discharged portions in accordance with the image configuration. Of course it would be evident to reverse this process, the toner adhering to the non-discharged portions, as well. As the adhering toner particles and the corresponding drum surface continue to rotate, they approach the transfer station area 520 which includes a further charging device 522. Application of the charging device 522 results in transferring the toner to the carrier or transfer medium which, in this case, is a web of paper 524. Paper is continuously supplied from source of paper such as the paper roll 526 along the intermediate drive and control rollers 528 and 530 to the drum 500 and beyond.

In accordance with a cut mark order received from the controller, an appropriate signal is applied along line 532 for activating a solenoid 534 for driving a marking device 536 to apply a mark along an edge of the web 524 in accordance with the desired cut location. A cut mark signal will conventionally be applied between pages of reproduced data and may be automatically generated by the computer at the end of an informational transfer sequence as by means of appropriate programming. The mark is placed on the back of the web 524 and is spatially and temporally coincident with the video write information position. As the web continues to pass the drum transfer station 520, it approaches a mark sense station 540. The mark sense station, which may typically consists of a resistance sensitive probe, detects the position of the mark and places an appropriate mark sense signal along line 542 to a cutter drive circuit 544. The cutter drive circuit activates a cutter mechanism 546, resulting in severance of the paper along a line position defined by the cut mark.

The cutter drive circuit 544 includes provision for a separate input derived from the cut immediate signal order. A cut immediate order will effect driving of a cutter mechanism 546 as soon after the cut immediate order as the end of the video information passes the cutter mechanism 546. The use of the cut immediate order thus requires appropriate circuitry taking into account the time delay necessary for transport of information from the write station on the drum to the point where it passes the cutter mechanism. The cutter drive is typically a solenoid actuated cutter blade, the force being exerted by the blade being in proportion to the magnitude and the current flow through the solenoid and determined by the web thickness and composition. A variable force option 548 controllable by means of an external control may be attached to the cutter drive circuit 544 for effecting a variable force in accordance with the thickness of the transfer web 524 passing beneath the cutter blade.

G. Form sense — As was discussed in conjunction with the write orders and with reference to FIGS. 2 and 5, a form sense option may be employed. A form sense option prevents transfer of information out of the buffer until the form sense order condition is satisfied. The purpose of the form sense order is to position a form which is to receive video information for printing at a location which will correspond to a predetermined position on the form. To this end, as shown in FIG. 7, a form sensor 550 is employed. The form sensor may take the form of a photocell 552 sensing a hole or a reflective portion positioned at a proper location 554 corresponding to the beginning or end or other suitable position defining a form location provided on the transfer web 524.

Figure 8:
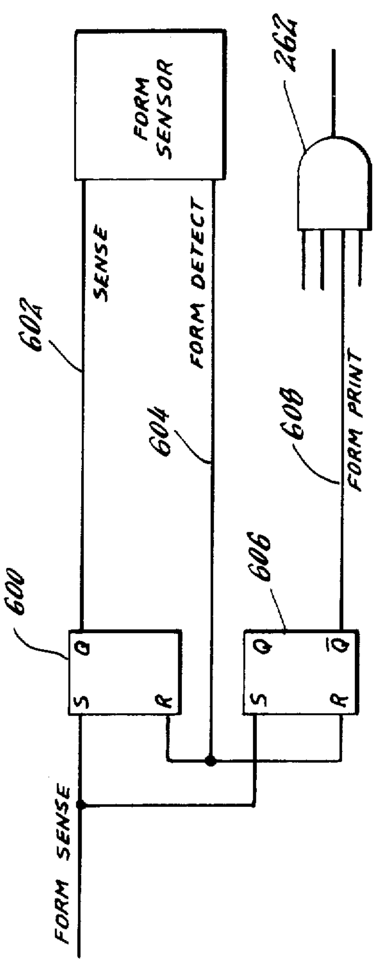
FIG. 8 is a detail of the logic circuitry of the form sense order.

Referring to FIG. 5, the appearance of a form sense order along the input order line 220 is decoded by the decoder 222 and provides activation signals logically corresponding to a write order. The logic circuit of FIG. 5 operates in accordance with the implementation of a write order with the exception that a form sense signal derived from the form sense order is applied to the printer via the terminal 560. The specific circuit for deriving logical signals corresponding to form sense orders is shown in FIG. 8. The properly sensed form signal produced in response to a form sense order provide another condition input to the AND gate 262 shown in FIG. 5 which governs the IN SYNC condition output of the latch 264. The circuit for accomplishing this function may include a latch 600 which is placed into its set condition by means of a form sense signal applied to the set input thereof. The set condition results in a high output appearing along the line 602 and pulsing the form sensor unit, shown in FIG. 7. Upon proper sensing of the form, a feedback signal is provided along the form line 604. In the meantime, the form sense signal has also set the latch 606 driving the high Q side thereof to a logic high signal and the low not Q side to a logic low signal, thereby blocking passage of an IN SYNC signal through the AND gate 262. Upon proper detection of a form, the form sensor ends an appropriate signal along the line 604 to the reset side of both latches 600 and 606. As a result, the latch 600 is reset and the sense line 602 returns to a low condition. The latch 606 is also reset, placing the low side output line 608 in a high condition, thereby conditioning the input to the AND gate 262 to accept its remaining inputs for providing an IN SYNC condition through the latch 264, as shown in FIG. 5.

V. CONCLUSION

In the foregoing description, there have been disclosed specific methods and apparatus for interfacing signals to and from a computer system with that of a facsimile graphic communication system in a new and improved manner. The configuration is particularly advantageous when employed with an LDX machine since a minimum amount of modification is necessary in order to conform the LDX to perform the various monitoring functions and interactions with the control adapter as described above. The LDX is modular in construction and employs operative circuit cards to effect the various operations. Merely by deployment of selected cards within the LDX circuit configurations, the modifications necessary to a standard LDX machine may be realized in accomplishing the objects of the present invention, whereas removal of these cards and replacement with the original will allow the LDX to operate conventionally.

The foregoing specific embodiment has described the use of the invention to control the flow of data from the computer to the facsimile system for printing. However, it will be obvious to those skilled in the art that the invention is equally applicable to provide video data from the facsimile system to the computer. In this latter configuration, as was described in FIG. 1, the only difference is that the facsimile system scans a document, producing video data signals along the video data line for transmission to the computer. More specifically, with reference to FIG. 2, the video data is entered into the shift register 138, in a serial by bit manner. The transfer gate now operates in reverse upon command, responsive to the transfer signal, to transfer the data into buffer 136. Upon entering of the data, the buffer acts to transfer the data, byte by byte, in parallel fashion along the data bus to the subcontroller 130 and then out along the data path 106 to the computer 100. The control functions, logic conditions, separation of sync from video, status conditions, and circuit operation all remain the same as described hereinabove in connection with the computer to printer interface.

While the disclosed circuits have been described in conjunction with specific logic circuitry, such circuitry is exemplary only as other circuits and apparatus could be utilized to perform the disclosed functions. For example, positive logic is employed in the description but it is obvious that negative logic could also be utilized without deviating from the principles as set forth hereinabove. Furthermore, many of the AND or OR gate functions, although shown as a discrete gating network, may employ hard wired function gating, as is well known.

In addition, the foregoing system has been shown and described in conjunction with an LDX scanner printer facsimile system in conjunction with an XDS sigma computer network. It should be apparent, however, as was stated hereinbefore, the other facsimile or graphic communications systems can be utilized with other computer or data processing systems without deviating from the principles of the disclosed and described invention.

Thus, while the present invention as to its objects and advantages as described herein has been set forth in specific embodiments thereof, they are to be understood as illustrative only and not limited thereby.

What is claimed is:

1. An interface adapter for controlling a line by line video data flow along a data carrier between a central processor and a facsimile device by providing separate video and synchronization data, comprising a source of video line data, control means for generating a load data command and coupled to said source, a master control counter providing a a data rate signal signifying a data loading rate and a periodic scan rate signal signifying the synchronization of data transfer;

first logic means coupled to said source, said counter and said control means and responsive to said load data command signal for loading said data line in a register, in accordance with said data rate signal, said register having a predetermined data capacity and providing a full signal indicative thereof;

second logic means responsive to said scan rate signal and to said full signal for transferring said data line from said register to said data carrier.

2. The adaptor of claim 1 wherein said first logic means loads data in said register parallel by byte and said second logic means transfers said data serially by bit.

3. The adapter of claim 2 wherein said register includes a ring counter having a count capacity corresponding to a predetermined number of bytes, and a buffer register having a number of stages corresponding to said number of bytes, means coupling said ring counter to each of said buffer register stages for entering each sequentially received byte in a respective one of said stages in accordance with said ring counter count capacity, and further including third logic means coupling said buffer register to said data carrier for transferring said data line to said data carrier.

4. The adaptor of claim 3 wherein said third logic means includes a shift register coupled between said register and said data carrier, means coupling said counter to said shift register for providing a continuous shift signal to said shift register, said third logic means transferring said data line to said shift register for transferring said data line to said data carrier.

5. The adaptor of claim 4 and wherein said ring counter is automatically reset for each new set of data bytes, further including a fourth logic means responsive to a condition input for inhibiting the reset operation of said ring counter and for inhibiting said transfer.

6. The adaptor of claim 5 wherein said condition input includes manually operable switching means removing said central processor generated data flow from said adaptor.

7. The adaptor of claim 5 further including a test module, said test module providing one of said condition inputs and placing a predetermined plurality of test bits along said data carrier.

8. The adaptor of claim 7 wherein said test module derives said bits from said master control counter, and including means coupling said test bits to said shift register for injecting said bits along said data carrier.

9. The adaptor of claim 1 wherein said facsimile device includes a cutter drive circuit, said cutter drive circuit responsive to a first order for marking a facsimile transfer web for cutting said web at said mark, and to a second order for cutting said web immediately upon cessation of said data flow.

10. The adaptor of claim 3 wherein said facsimile device includes a form sense circuit for sensing the position of a transfer web form, and including further logic means for sensing said form sense upon command and providing a signal to said third logic means as a condition of said transfer.

11. The adaptor of claim 9 wherein said cutter device circuit includes means coupled thereto for varying the cutting force said cutter drive circuit applies to cut said transfer web.

12. An interface adaptor for controlling a line by line video data flow along a data carrier between a central processor and a facsimile device by providing separate video and sync data, comprising a master control counter providing a data sync signal, a data rate signal, a scan rate signal, and a shift signal, a buffer having a predetermined bit capacity and supplying a full signal upon achieving said capacity, a shift register responsive to said shift signal for continually shifting the contents thereof along said data carrier, a control logic, said control logic including first logic means response to an initiating order and to said data rate signal to begin loading a line of data in said buffer at said data rate, second logic means responsive to said sync signal and to said full signal for conditioning a third logic means, said third logic means in said conditioned state responsive to said scan rate signal for transferring the contents of said buffer to said shift register, said shift register thereby shifting said data line out along said data carrier.

13. The adaptor of claim 12 wherein said first logic means loads data in said register parallel by byte and said shift register transfers said data serially by bit.

14. The adaptor of claim 13 wherein said buffer includes a ring counter having a count capacity corresponding to a predetermined number bytes, and a buffer register having a number of stages corresponding to said number of bytes, means coupling said ring counter to each of said buffer register stages for entering each sequentially received byte in a respective one of said stages in accordance with said ring counter count capacity, and means coupling said third logic means to said buffer register for transferring said data line to said data carrier.

15. The adaptor of claim 12 wherein said third logic means includes a shift register coupled between said register and said data carrier means coupling said counter to said shift register for providing a continuous shift signal to said shift register, said third logic means transferring said said data line to said shift register for transferring said data line to said data carrier.

16. The adaptor of claim 15 and wherein said ring counter is automatically reset for each new set of data bytes, further including a fourth logic means responsive to a condition input for inhibiting the reset operation of said ring counter and for inhibiting said transfer.

17. The adaptor of claim 16 wherein said condition input includes manually operable switching means removing said central processor generated data flow from said adaptor.

18. The adaptor of claim 16 further including a module, said test module providing one of said condition inputs and placing a predetermined plurality of test bits along said data carrier.

19. The adaptor of claim 18 wherein said test module devices said bits from said master control counter, and including means coupling said test bits to said shift register for injecting said bits along said data carrier.

20. The adaptor of claim 12 wherein said facsimile device includes a cutter drive circuit, said cutter device circuit responsive to a first order for marking a facsimile transfer web for cutting said web at said mark, and to a second order for cutting said web immediately upon cessation of said data flow.

21. The adaptor of claim 20 wherein said cutter drive circuit includes means coupled thereto for varying the cutting force said cutter drive circuit applies to cut said transfer web.

22. The adaptor of claim 12 wherein said facsimile device includes a form sense circuit for sensing the position of a transfer web form, and including further logic means for sensing said form sense upon command and providing a signal to said third logic means as a condition of said transfer.

23. A graphic communication system comprising:

facsimile system means for receiving graphic information representative of information on a document or the like, said facsimile system means comprising:

scanner means for generating said graphic information to be transmitted representative of information on said document or the like, and printer means for creating a facsimile record in accordance with said received graphic information wherein said graphic information includes data synchronizing and supervisory control signals;

computer means for generating said graphic information, said computer means being an electronic data processing system capable of internal electrical operations according to a predetermined program, and electrical interface means coupled between said facsimile system means and said computer means for converting said graphic information into interface signal formats compatible with the operation of said computer means and said facsimile system means, said electrical interface means comprising:

a subcontroller for intercoupling orders and data lines with said computer means, a master control counter generating at predetermined count positions a first signal representing the rate of data received, a second signal representing the end of a data line, a third signal representing the end of a scan, a fourth signal corresponding to a line sync signal, and a fifth signal corresponding to a shift rate, a buffer having a predetermined count capacity and providing a full signal upon achievement thereof, a shift register, and a control logic circuit, said control logic responsive to an initiating order from said subcontroller and in turn derived from said computer for providing an initiating signal to said facsimile system, and to said first signal and said initiation order for loading a data line into said buffer, said buffer generating said full signal in response to full loading thereof, said facsimile system responsive to said initiating signal and said fourth signal for providing a plurality of status signals indicating said system is ready to operate, said control logic responsive to said status signals, said full signal, and the next of said third signals after said full signal for generating a transfer signal, said shift register responsive to said fifth signal for continuously shifting the contents thereof to a data carrier, said buffer responsive to said transfer signal for transferring the data line from said buffer to said shift register, said shift register thereby shifting said data line along said data carrier.

24. The system of claim 23 wherein said buffer receives data in the form of parallel by byte information and said shift register shifts data out in a serial by bit manner, said buffer including a transfer gate responsive to said transfer signal for transferring the contents of said buffer to said shift register.

25. The system of claim 23 wherein said buffer includes a ring counter having a count capacity corresponding to a predetermined number bytes, and a buffer register having a number of stages corresponding to said number of bytes, means coupling said ring counter to each of said buffer register stages for entering each sequentially receiving byte in a respective one of said stages in accordance with said ring counter count capacity, and means coupling said third logic means to said buffer register for transferring said data line to said data carrier.

26. The system of claim 25 wherein said ring counter is automatically reset for each new group of data bytes, said control logic further including means responsive to a condition input for inhibiting the reset operation of said ring counter and for inhibiting said transfer.

27. The system of claim 26 wherein said condition input includes manually operable switching means.

28. The system of claim 27 further including a module, said test module providing one of said condition inputs and placing a predetermined plurality of test bits along said data carrier for use in said printer.

29. The system of claim 28 wherein said test module derives test bits from said master control counter, and including means coupling said test bits to said shift register for injecting said bits along said data carrier.

30. The system of claim 23 wherein said facsimile device includes a cutter drive circuit, said cutter drive circuit responsive to a first order for marking a facsimile transfer web for cutting said web at said mark, and to a second order for cutting said web immediately upon cessation of said data flow.

31. The system of claim 30 wherein said cutter drive circuit includes means coupled thereto for varying the cutting force said cutter drive circuit applies to cut said transfer web.

32. The system of claim 23 wherein said facsimile device includes a form sense circuit for sensing the position of a transfer web form, and including further logic means for sensing said form sense upon command and providing a signal to said third logic means as a condition of said transfer.

* * * * *